United States Patent
Cohen et al.

(10) Patent No.: US 7,515,701 B2
(45) Date of Patent: Apr. 7, 2009

(54) METHOD AND APPARATUS FOR SCREENING CALLS FROM A TELEPHONY DEVICE

(75) Inventors: Marc A. Cohen, Powell, OH (US); Daniel S. Stoops, Galena, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 618 days.

(21) Appl. No.: 10/452,358

(22) Filed: Jun. 2, 2003

(65) Prior Publication Data

US 2004/0240641 A1    Dec. 2, 2004

(51) Int. Cl.
*H04M 3/42*    (2006.01)

(52) U.S. Cl. .................. 379/211.01; 379/70; 379/87; 379/88.12; 379/88.22; 455/417

(58) Field of Classification Search .......... 379/87, 379/70, 88.12, 88.22, 211.01; 455/417
See application file for complete search history.

(56) References Cited

U.S. PATENT DOCUMENTS

| | | | | |
|---|---|---|---|---|
| 5,511,111 A | * | 4/1996 | Serbetcioglu et al. .... | 379/88.01 |
| 5,651,054 A | * | 7/1997 | Dunn et al. ............... | 379/88.11 |
| 5,960,064 A | * | 9/1999 | Foladare et al. .......... | 379/88.26 |
| 6,310,939 B1 | * | 10/2001 | Varney ..................... | 379/88.01 |
| 6,337,898 B1 | * | 1/2002 | Gordon ..................... | 379/67.1 |
| 6,353,660 B1 | * | 3/2002 | Burger et al. ............. | 379/88.17 |
| 6,453,023 B1 | * | 9/2002 | McKee ..................... | 379/88.25 |
| 6,453,164 B1 | * | 9/2002 | Fuller et al. ................ | 455/445 |
| 6,459,913 B2 | * | 10/2002 | Cloutier ..................... | 455/567 |
| 6,639,972 B1 | * | 10/2003 | Cannon et al. ........... | 379/88.18 |
| 6,661,886 B1 | * | 12/2003 | Huart et al. ............. | 379/215.01 |
| 6,700,957 B2 | * | 3/2004 | Horne ....................... | 379/93.09 |
| 2003/0142795 A1 | * | 7/2003 | Gavette et al. ............. | 379/67.1 |
| 2004/0141593 A1 | * | 7/2004 | Simpson .................. | 379/88.12 |
| 2004/0165706 A1 | * | 8/2004 | Sarakas .................... | 379/88.22 |

\* cited by examiner

*Primary Examiner*—Fan Tsang
*Assistant Examiner*—Hemant Patel

(57) ABSTRACT

A messaging system component provides for a screening of an incoming call from a telephony device of a plurality of telephony devices. The messaging system component is associated with a network and conforms to a signaling protocol of the network to communicate with the network. The messaging system component is located in a peripheral relationship to the network which allows for the addition of providing for the screening of the incoming call from the telephony device without modification to an architecture associated with the network.

25 Claims, 6 Drawing Sheets

METHOD AND APPARATUS FOR SCREENING CALLS FROM A TELEPHONY DEVICE

TECHNICAL FIELD

The invention relates generally to telephony devices associated with a network and more particularly to employing the telephony devices for screening a call on the network.

BACKGROUND

A user of a called telephony device receives a call from a network. The user of the called telephony device desires to screen the call before deciding to respond to the call. In one example, an answering machine is used as a screening device. The user of the called telephony device listens to a message being recorded by a user of the calling telephony device from a speaker of the answering machine. Where the user of the called telephony device is not located close to the speaker of the answering machine, the user is unable to screen the call as the user is unable to hear the message being recorded.

In another example, a voice mail system associated with a telephone network is used as the screening device. The user of the called telephony device receives the call and fails to respond to the call. The call is redirected to the voice mail system associated with the called telephony device where the user of the calling telephony device records the message. Unfortunately, with the network-based voice mail system the user of the called telephony device is unable to screen the call in real-time as the user of the called telephony device must wait for the user of the calling telephony device to finish recording the message before screening the call.

An Advanced Intelligence Network ("AIN") provides for the screening of the call in real-time from the network-based voice mail system but requires altering an architecture (e.g. altering and/or replacing one or more switches) of the telephone network. Unfortunately, service providers associated with the telephone network incur significant expense for altering the architecture of the telephone network to provide for the screening of the calls.

Therefore, a need exists to provide for the screening of the call associated with a network-based voice mail system from a telephony device without material alteration to the telephone network.

SUMMARY

The invention in one embodiment encompasses an apparatus. The apparatus comprises a messaging system component that provides for a screening of an incoming call from a telephony device of a plurality of telephony devices. The messaging system component is associated with a network and conforms to a signaling protocol of the network to communicate with the network.

Another embodiment of the invention encompasses a method. A messaging system component associated with a network provides for a screening of an incoming call from a telephony device. The messaging system component conforms to a signaling protocol of the network to communication with the network.

Yet another embodiment of the invention encompasses an article. The article comprises one or more computer-readable media. The article comprises means in the computer-readable medium for screening of an incoming call from a telephony device by a messaging system component associated with customer premises equipment at a periphery of a network. The article comprises means in the computer-readable medium for conforming to a signaling protocol of a network by the messaging system component to communicate with the network. The article comprises means in the computer-readable medium for retrieving a profile associated with a called telephony device of the incoming call from a database. The article comprises means in the computer-readable medium for employing the profile associated with the called telephony device, wherein the messaging system component provides for the screening of the incoming call by one of initiating a screening outcall and responding to a screening in-call.

DESCRIPTION OF THE DRAWINGS

Features of exemplary implementations of the invention will become apparent from the description, the claims, and the accompanying drawings in which:

DETAILED DESCRIPTION

The particular values and configurations discussed in these non-limiting examples can be varied and are cited merely to illustrate an embodiment of the present invention and are not intended to limit the scope of the invention.

Figure 1:
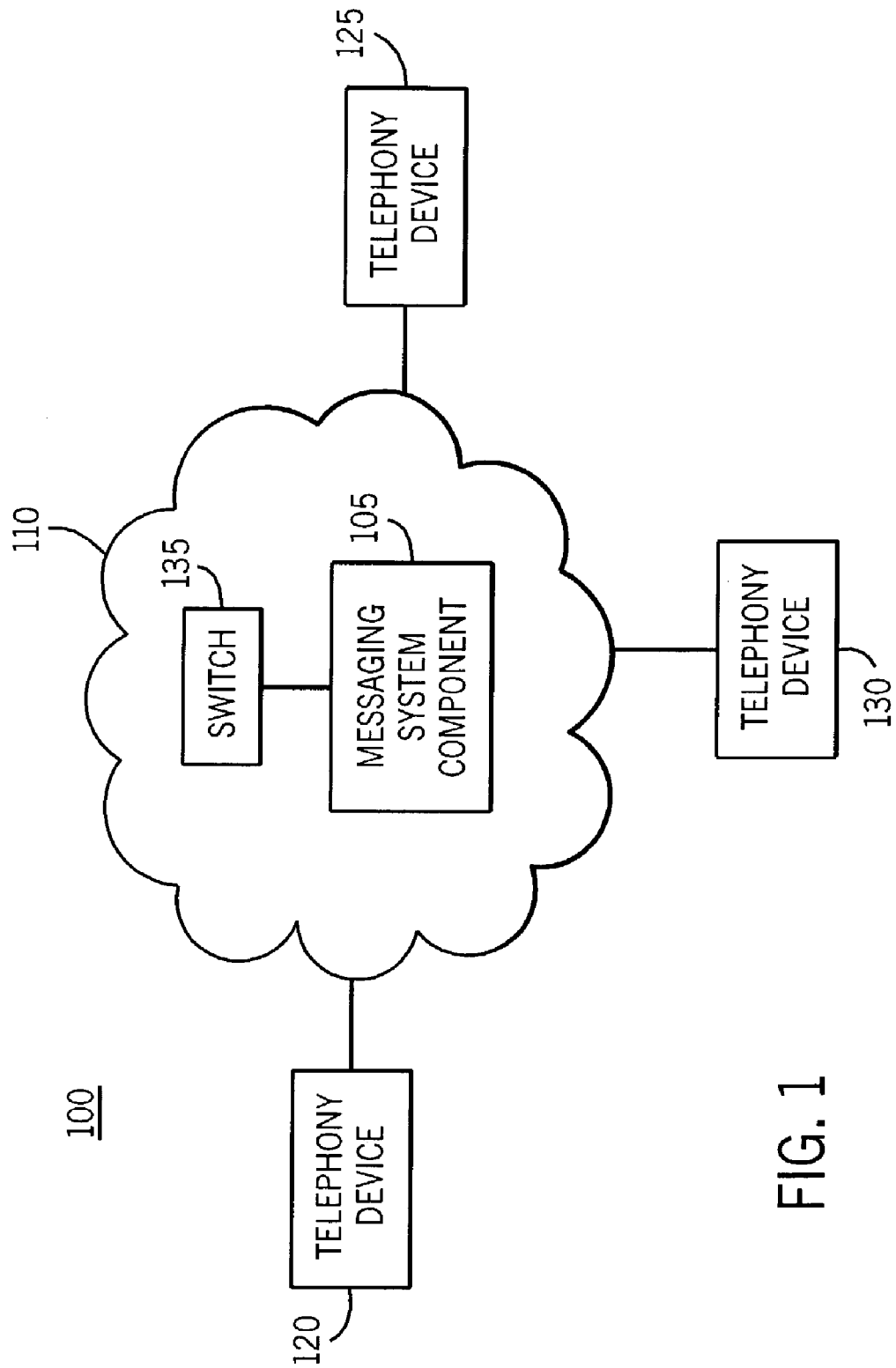
FIG. 1 is a representation of one exemplary implementation of an apparatus that comprises a messaging system component, a network, a plurality of telephony devices and a switch.

Turning to FIG. 1, an apparatus 100 in one embodiment comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 comprises a messaging system components 105, a network 110, one or more telephony devices 120, 125, and/or 130, and a switch 135. The messaging system component 105 comprises a voice mail system. The network 110 comprises a collection of networks, switches, trunks, and signaling points, as will be understood by those skilled in the art. The telephony device 120, 125, and/or 130 comprise one or more of a telephone, a cellular phone, and/or a personal computer.

The messaging system component 105 is associated with customer premises equipment at a periphery of a network, as is appreciated by one skilled in the art. The messaging system component 105 communicates with the switch 135. The switch 135 routes the one or more calls to the messaging system component 105. The messaging system component 105 receives the one or more calls from the switch 135 and initiates the one or more calls to the switch 135. The network 110 communicates with the switch 135 and the telephony devices 120, 125, and 130 to route the one or more calls. The telephony devices 120, 125, and 130 communicate with the network 110 to initiate and/or receive the one or more calls.

The messaging system component 105 provides for: a termination of the incoming call associated with a called telephony device, for example, the telephony device 125; and a screening of the incoming call from a telephony device, for example, the telephony device 130, of a plurality of telephony devices, for example, the telephony devices 120, 125, and 130, associated with the called telephony device. The messaging system component 105 conforms to a signaling protocol, for example, the Signal System 7 ("SS7") protocol to communicate with the network 110.

The network 110 routes one or more calls, for example, one or more voice calls or one or more Voice Over Internet Protocol ("VoIP") calls. The network 110 receives the one or more calls from one or more of the messaging system component 105, and the telephony devices 120, 125, and 130. The network 110 routes the one or more calls to either one or more of the messaging system component 105, and the telephony devices 120, 125, and 130. The network 110 comprises the switch 135. The network 110 comprises multiple network components that are owned by one or more of: long distance carriers, local exchange carriers, and local telephone companies. The network 110 routes the one or more calls based upon a calling party number and/or a called party number, for example, an E.164 number (e.g. 888-555-1000) or a Universal Resource Identifier ("URI") (e.g. www.myhome.com or myemail@yahoo.com), of the one or more calls, as is understood by those skilled in the art. The network 110 communicates by adhering to the signaling protocol.

In one example, the telephony device 120 initiates the incoming call to the telephony device 125. The telephony device 125 receives the incoming call from the calling telephony device. The telephony device 130 screens the incoming call associated with the called telephony device. The telephony devices 120, 125, and 130 communicate by conforming to the signaling protocol.

The messaging system component 105 provides for the termination of the incoming call of the one or more calls initiated by the calling telephony device by playing one pre-recorded greeting of one or more pre-recorded greetings to the telephony device 120 and providing the telephony device 120 with an opportunity to record a message for the telephony device 125, as will be appreciated by those skilled in the art. The messaging system component 105 stores the message in the mailbox associated with the telephony device 125.

The messaging system component 105 provides for the screening of the incoming call from the telephony device, for example, the telephony device 130, by bridging the incoming call to a screening call associated with the telephony device in a listen-only mode. The telephony device 130 listens in real-time to the message being recorded by the telephony device 120 for the telephony device 125. Upon receipt of a trigger from the telephony device 130 the messaging system component 105 bridges the incoming call to the screening call in a two-way mode. The telephony device 130 engages in an interactive session with the calling telephony device.

In one example, the screening call comprises a screening outcall. The messaging system component 105 initiates one or more screening outcalls to one or more telephony devices of the plurality of telephony devices associated with the called telephony device, for example, the telephony device 125. The screening outcall comprises the calling party number of a messaging system number that identifies the screening outcall. For example, the telephony device of the one or more screening devices associated with the called telephony device employs the calling party number of the messaging system number displayed on a caller identification functionality to determine whether to respond to the screening outcall, where the telephony device comprises the caller identification functionality. Those skilled in the art will be familiar with other devices that may be employed as indicators to determine whether to respond to the screening outcall.

In another example, the screening call comprises a screening in-call. The messaging system component 105 responds to the screening in-call initiated by the telephony device of the plurality of telephony devices associated with the called telephony device, for example, the telephony device 125. The screening in-call comprises the called party number of a screening number and the calling party number. The calling party number and the called party number comprise one or more of either: a E.164 number (e.g. 888-555-1000) and a URI (e.g. www.myemail.com) associated with the telephony device, for example, the telephony device 130.

The messaging system component 105 employs the screening number to associate the screening in-call with the mailbox associated with the called telephony device, for example, the telephony device 125 in which the message is being recorded. The messaging system component 105 employs the screening number of the screening in-call to omit providing for the termination service associated with the telephony device 125 for the screening in-call. The network 110 routes the screening in-call to the messaging system component 105 based on the called party number, for example, the screening number.

Figure 2:
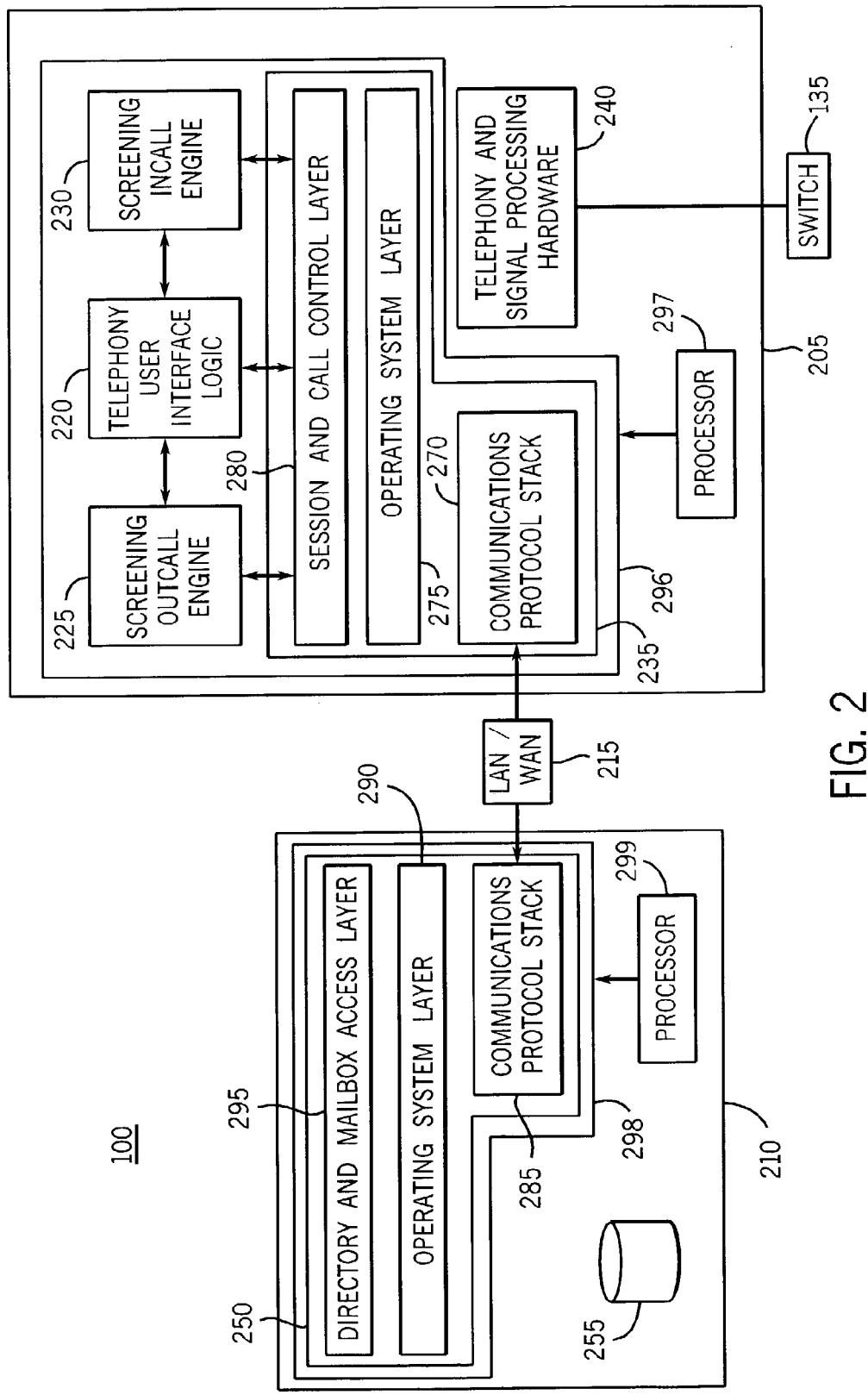
FIG. 2 is a representation of the messaging system component of the apparatus of FIG. 1 that comprises a telephony component and a storage component.

Turning to FIG. 2, the messaging system component 105 comprises a telephony component 205, a storage component 210, and a connecting network 215. The telephony component 205 and the storage component 210 provide for the termination of the incoming call. The telephony component 205 plays one pre-recorded greeting and provides the opportunity to record the message based on one profile associated with the called telephony device, for example, the telephony device 125, of a plurality of profiles associated with the telephony devices 120, 125, and 130. The storage component 210 stores the message in the mailbox associated with the telephony component 125.

The telephony component 205 provides for the screening of the incoming call by the telephony device based upon the one profile associated with the telephony device 125 of the plurality of profiles. The storage component 210 stores the plurality of profiles. The plurality of profiles comprise a respective plurality of numbers. The respective plurality of numbers are associated with a plurality of screening devices associated with the telephony devices 120, 125, and 130, respectively.

In one example, the telephony component 205 serves to communicate with the storage component 210 over the connecting network 215. In one example, the connecting network 215 comprises a local area network ("LAN"). In another example, the connecting network 215 comprises a wide area network ("WAN").

The telephony component 205 comprises a user interface logic component 220, a screening outcall engine 225, a screening in-call engine 230, a protocol stack 235, and telephony and signal processing hardware 240. The user interface logic component 220 communicates with the screening outcall engine 225, the screening in-call engine 230, and the protocol stack 235. The protocol stack 235 communicates with the user interface logic component 220, the screening outcall engine 225, the screening in-call engine 230, the connecting network 215, and the telephony and signal processing hardware 240.

The user interface logic component 220 provides for the termination of the call by playing the one pre-recorded greeting to the telephony device 120 and provides the telephony device 120 with the opportunity to record the message for the telephony device 125, as is understood by those skilled in the art. The screening outcall engine 225 in combination with the protocol stack 235 bridges the call with the screening outcall associated with the telephony device 130. The screening outcall engine 225 monitors the screening outcall. The screening in-call engine 230 in combination with the protocol stack 235 bridges the call to the screening in-call associated with the telephony device 130. The screening in-call engine 230 monitors the screening in-call. The telephony and signal processing hardware 240 conforms to the signaling protocol of the network 110 to process the one or more calls received from or initiated to the network 110. The protocol stack 235 bridges the incoming call to the screening call.

The user interface logic component 220 provides for the screening of the incoming call from the telephony device based on the one profile associated with the telephony device 125. The user interface logic component 220 obtains the one profile associated with the telephony device 125. In one example, the user interface logic component 220 communicates with the screening outcall engine 225 to initiate the plurality of screening outcalls to the plurality of screening devices associated with the telephony device 125. In another example, the user interface logic component 220 communicates with the screening in-call engine 230 to respond to the one screening in-call from the telephony device 130.

For example, the messaging system component 105 employs one or more filter rules of the one profile to evaluate the call, as is understood by those skilled in the art. The messaging system component 105 initiates one screening outcall of the plurality of screening outcalls to the telephony device 130, and a second screening outcall to a work email address, based on the one or more filter rules for the call comprising the calling party number of a family member's cellular phone, as is understood by those skilled in the art. The one profile associated with the telephony device 125 comprises the number associated with the telephony device, the work email address, and the one or more filter rules.

The screening outcall engine 225 in combination with the protocol stack 235 bridges the incoming call to the screening outcall in the listen-only mode. The screening outcall engine 225 monitors the screening outcall to the telephony device 130. Upon receipt of the trigger, the screening outcall engine 225 in combination with the protocol stack 235 bridges the incoming call to the screening outcall in the two-way mode providing for the interactive session between the telephony device 130 and the calling telephony device, for example, the telephony device 120. The screening in-call engine 230 monitors the screening in-call from the telephony device 130 in an analogous fashion as the screening outcall engine 225.

The screening in-call engine 230 employs the calling party number of the screening in-call to associate the screening in-call with the mailbox of the telephony device 125. The screening in-call engine 230 performs a validation on the calling party number of the screening in-call to ensure that the message is being recorded for the telephony device 125. In one example, if the message is not being recorded when the telephony device 130 initiates the screening in-call the screening in-call engine 230 withholds bridging the screening call. The user interface logic component 220 plays an information message to the telephony device 130 indicating that the message is not available to be screened.

The screening outcall engine 225 and the screening in-call engine 230 respond to the trigger, for example, a touch-tone, initiated by the telephony device 130 while screening the incoming call. The screening outcall engine 225 employs the trigger to bridge the incoming call to the screening outcall in the two-way mode and to halt the recording of the message by the messaging system component 105. In another example, the screening in-call engine 230 employs the trigger to: bridge the incoming call to the screening in-call in the two-way mode; halt the recording of the message by the messaging system component 105; and store the message in the mailbox (e.g. a voice mailbox) associated with the telephony device 125. In a further example, the screening outcall engine 225 employs the trigger to: bridge the incoming call to the screening outcall in the two-way mode; record the interactive session between the calling telephony device and the screening device; and deposit the recording of the interactive session into the mailbox associated with the telephony device 125.

The protocol stack 235 comprises a communications protocol stack 270, an operating system layer 275, and a session and call control layer 280, as will be appreciated by those skilled in the art. The communications protocol stack 270 processes the one or more calls received from or initiated to the network 215. The operating system layer 275 provides one or more instructions for the protocol stack 235. The session and call control layer 280 manages the one or more calls and bridges the incoming call to the screening call. The telephony and signal processing hardware 240 serves to send and receive the one or more calls from the network 110. The telephony and signal processing hardware 240 conforms to the signaling protocol of the network allowing the messaging system component 105 to comprise a peripheral relationship to the network.

The storage component 210 comprises a protocol stack 298 and a database 255. The protocol stack 298 communicates with the connecting network 215 and accesses the database 255, as is understood by those skilled in the art. The database 255 comprises one or more mailboxes for the respective telephony devices 120, 125, and 130. The database 255 stores the one or more messages recorded for the telephony devices 120, 125, and 130 in the respective one or more mailboxes. The database 255 comprises the plurality of profiles associated with the respective telephony devices 120, 125, and 130.

The protocol stack 250 comprises a communications protocol stack 285, an operating system layer 290, and a directory and mailbox access layer 295. The communications protocol stack 285 processes the one or more calls received from and initiated to the connecting network 215. The operating system layer 290 in one example provides one or more instructions for the protocol stack 250. The directory and mailbox access layer 295 manages one or more accesses to the database 255 by the telephony component 205, as will be appreciated by those skilled in the art.

Referring to FIG. 2, the telephony component 205 and the storage component 210 comprises one or more of random access memory ("RAM"), read only memory ("ROM"), one or more hard disks, and one or more floppy disks. The storage devices 296 and 298 serve to store software instructions. Processors 297 and 299 comprise microprocessors. The processors 297 and 299 retrieve the software instructions from the respective storage devices 296 and 298 and perform actions in accordance with the software instructions. For example, the software instructions serve to cause the processor 297 to initiate the plurality of screening outcalls, respond to the incoming call, and to process the screening in-call as described herein.

Figure 3:
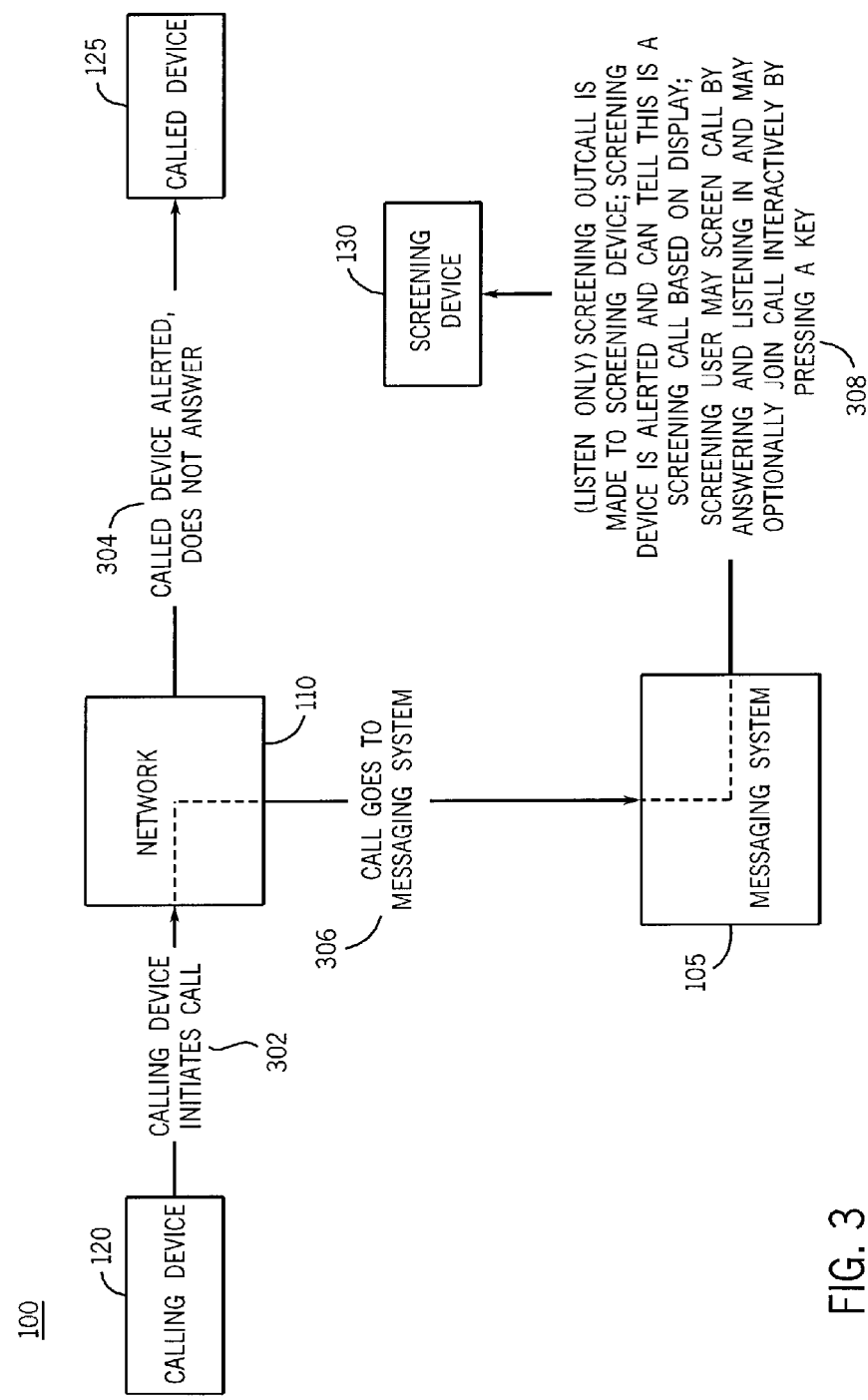
FIG. 3 is an exemplary diagram of a first flow of an incoming call from a calling telephony device to a called telephony device and a redirection of the incoming call to the messaging system component. The messaging system component initiates a screening outcall to one of the plurality of telephony devices of the apparatus of FIG. 1.

Turning to FIG. 3, the messaging system component 105, the network 110, and the telephony devices 120, 125, and 130 route the incoming call from the telephony device 120 to the telephony device 125 by performing one or more steps, for example, STEPS 302, 304, 306, and 308.

As illustrated in the STEP 302, the telephony device 120 initiates the incoming call to the telephony device 125. The network 110 receives the incoming call and routes the incoming call to the switch 135. The switch 135 routes the call to the telephony device 125, as illustrated in the STEP 304. Where the telephony device 125 fails to respond to the call, the network 110 re-routes the incoming call to the messaging system component 105, as illustrated in the STEP 306, as will be understood by those skilled in the art. The messaging system component 105 provides for the termination of the incoming call based on the one profile associated with the telephony device 125. The message system component 105 employs the one profile associated with the telephony device 125 to provide for the screening of the incoming call from the telephony device 130. The messaging system component 105 initiates the screening outcall to the telephony device 130 based on the profile associated with the telephony device 125, as illustrated in STEP 308. The messaging system component 105 bridges the screening outcall with the incoming call in the listen-only mode and monitors the incoming call for the trigger.

Figure 4:
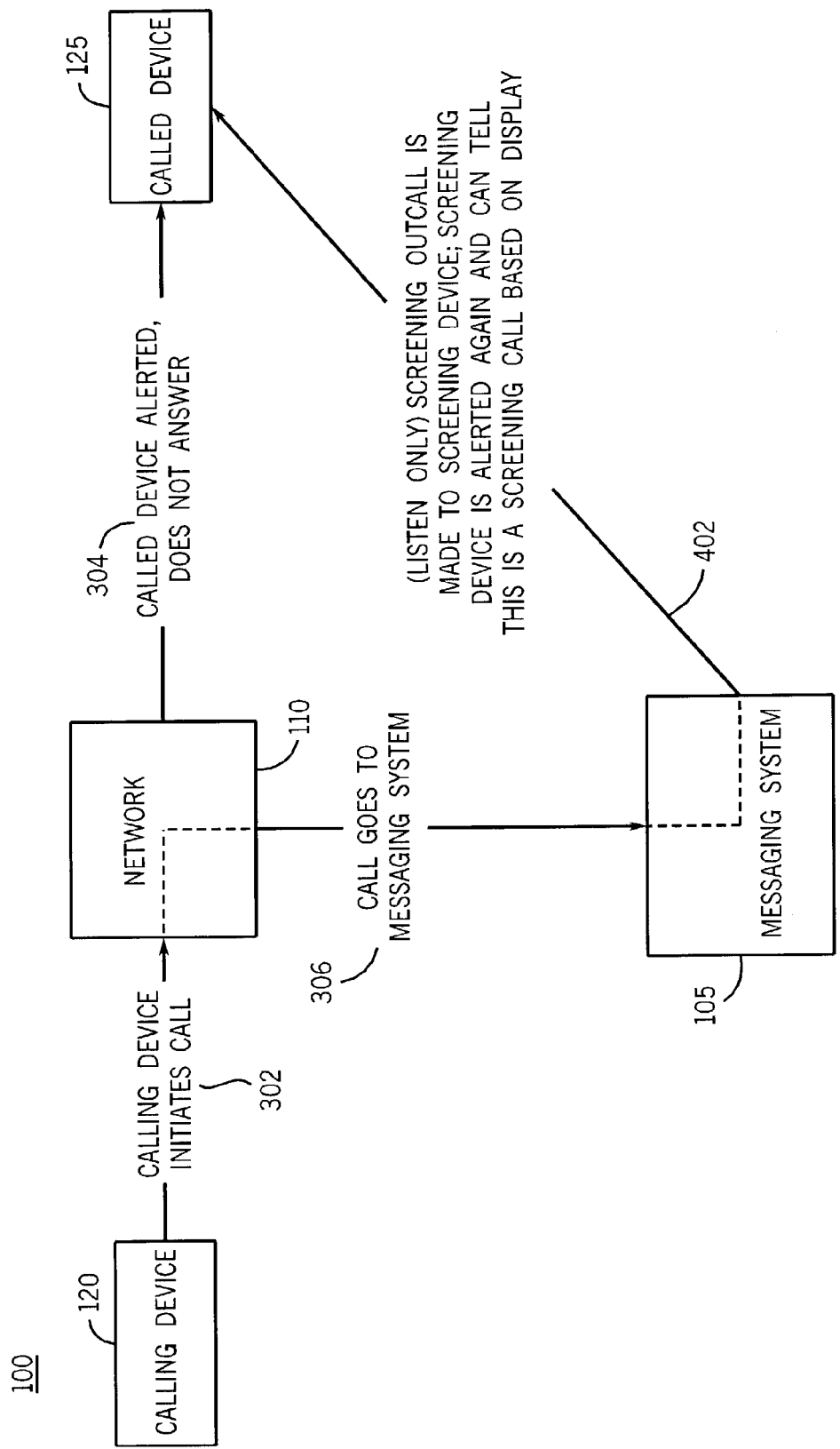
FIG. 4 is an exemplary diagram of a second flow of an incoming call from the calling telephony device to the called telephony device and the redirection of the incoming call to the messaging system component. The messaging system component initiates the screening outcall to the called telephony device of the apparatus of FIG. 1.

Turning to FIG. 4, the messaging system component 105, the switch 135, the telephony device 120, and the telephony device 125 route the incoming call from the calling telephony device, for example, the telephony device 120, to the called telephony device, for example, the telephony device 125, by performing one or more steps, for example, the STEPS 302, 304, 306, and STEP 402.

Referring to FIG. 4, the telephony device 125 receives two notifications of the incoming call. In the STEPS 302 and 304, the telephony device 125 receives the incoming call initiated by the telephony device 120. Where the telephony device 125 fails to respond to the call, the switch 135 re-routes the incoming call to the messaging system component 105, as illustrated in STEP 306. The messaging system component 105 provides for the termination of the incoming call based on the one profile associated with the telephony device 125. The one profile associated with the telephony device 125 indicates that the telephony device 125 comprises the telephony device. The messaging system component 105 initiates the screening outcall to the telephony device 125, as is shown in STEP 402.

Figure 5:
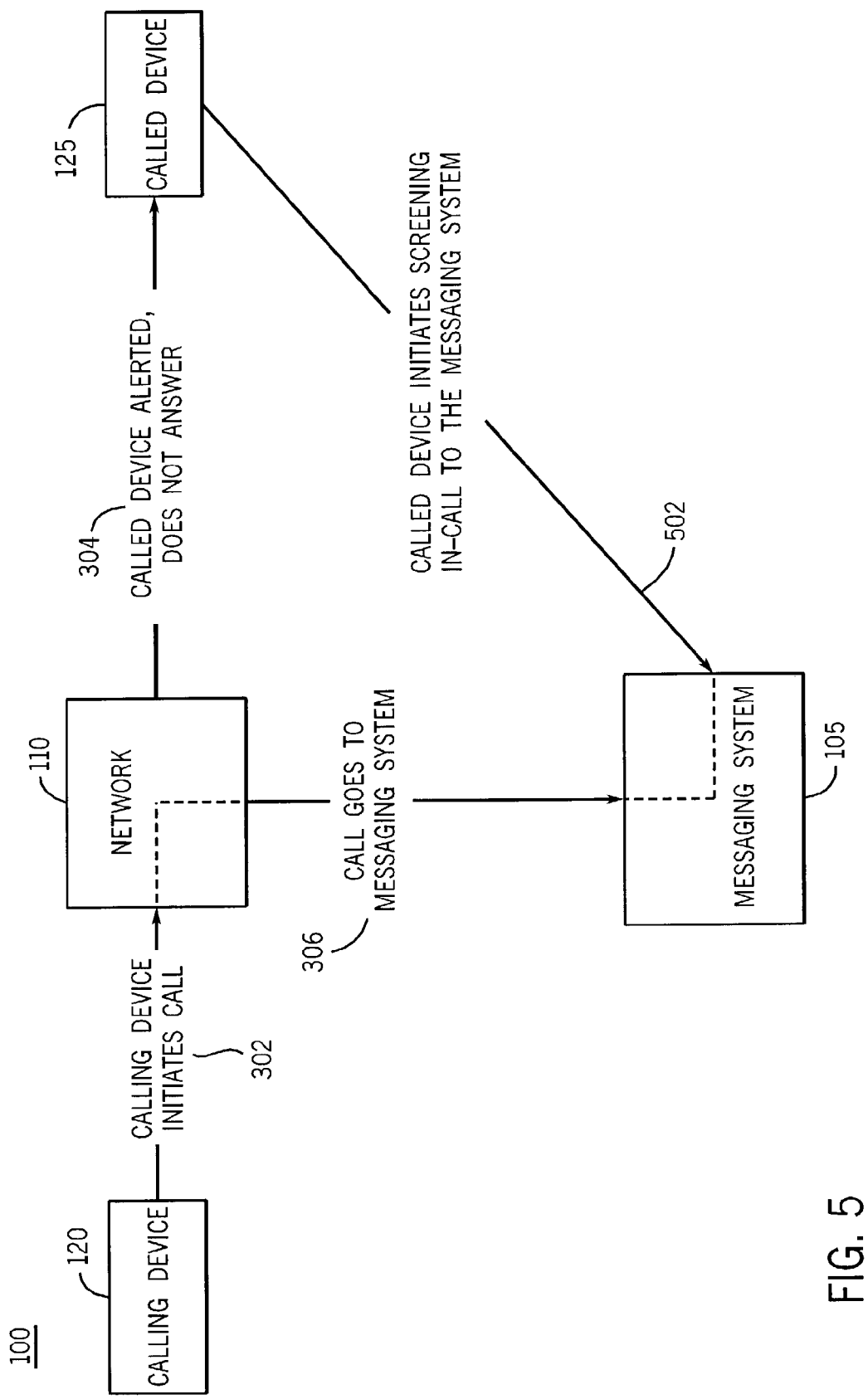
FIG. 5 is an exemplary diagram of a third flow of an incoming call from the calling telephony device to the called telephony device and the redirection of the incoming call to the messaging system component. The called telephony device initiates a screening in-call to the messaging system component of the FIG. 2.

Turning to FIG. 5, the messaging system component 105, the switch 135, the telephony device 120, and the telephony device 125 route the incoming call from the calling telephony device, for example, the telephony device 120, to the called telephony device, for example, the telephony device 125, by performing one or more steps, for example, the STEPS 302, 304, 306, and STEP 502.

The telephony device 125 receives the incoming call in the STEPS 302 and 304. Where the telephony device 125 fails to respond to the call, the switch 135 re-routes the incoming call to the messaging system component 105, as illustrated in STEP 306. The messaging system component 105 provides for the termination of the incoming call based on the one profile associated with the telephony device 125. In the STEP 502, the telephony device 125 initiates the screening in-call to the messaging system component 105. The screening in-call comprises the called party number of the screening number to the messaging system component 105. Upon receipt of the screening in-call, the messaging system component 105 associates the calling party number of the screening in-call with the mailbox of the telephony device 125 and bridges the incoming call to the screening in-call in the listen-only mode providing for the screening of the incoming call from the telephony device 125.

Figure 6:
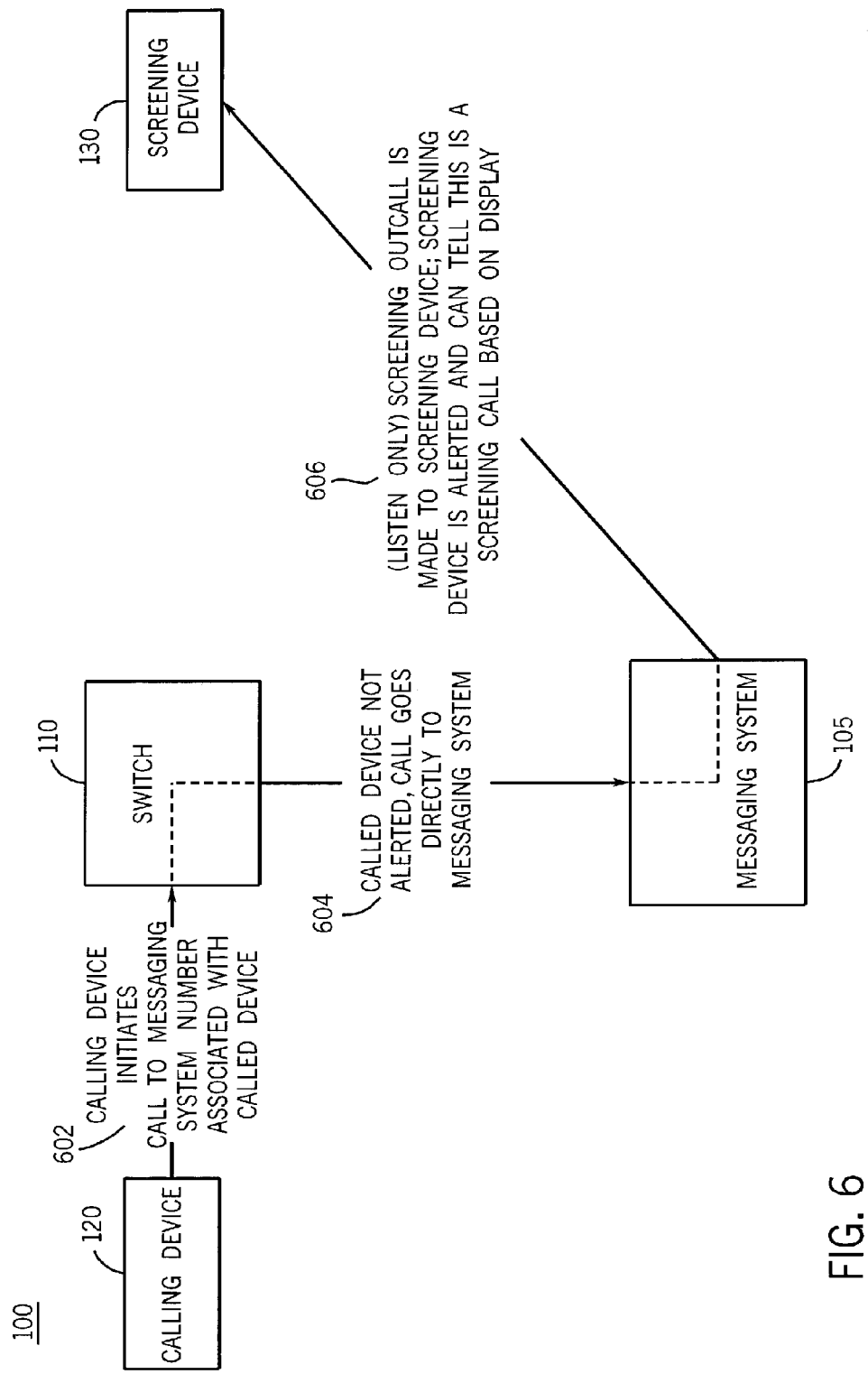
FIG. 6 is an exemplary diagram of a fourth flow of an incoming call from the calling telephony device to the messaging system component. The messaging system component initiates a screening outcall to the called telephony device of the apparatus of FIG. 1.

Turning to FIG. 6, the messaging system component 105, the switch 135, the telephony device 120, and the telephony device 130 route the incoming call from the calling telephony device, for example, the telephony device 120, to the messaging system component 105 by performing one or more steps, for example, STEPS 602, 604, and 606.

In the STEP 602, the telephony device 120 initiates the incoming call comprising the messaging system number as the called party number. The switch 135 routes the incoming call to the messaging system component 105, as illustrated in the STEP 604, based on the called party number. Upon receipt of the call, the messaging system component 105 provides for the termination of the incoming call based on the one profile associated with the telephony device 125, where the messaging system component 105 associates the messaging system number with the telephony device 125. The messaging system component 105 in the STEP 606 initiates the screening outcall to the telephony device 130 and bridge the incoming call to the screening outcall providing for the screening of the incoming call from the telephony device 130.

An illustrative description of exemplary operation of the apparatus 100 is presented, for explanatory purposes.

In one example, the telephony device 120 initiates the incoming call to the telephony device 125. The network 110 routes the call from the telephony device 120 to the telephony device 125. Where the telephony device 125 fails to respond to the incoming call within a pre-determined number of alerts, the network 110 re-routes the incoming call to the switch 135, as is understood by those skilled in the art. The switch 135 routes the call to the messaging system component 105.

The telephony and signal processing hardware 240 receives the call and parses the call. The protocol stack 235 communicates with the storage component 210 to retrieve the one profile associated with the telephony device 125. The user interface logic 220 employs the one profile associated with the telephony device 125 to play the one pre-recorded greeting to the telephony device 120 and to provide the telephony device 120 with the opportunity to record the message for the telephony device 125.

The user interface logic component 220 employs the one profile associated with the telephony device 125 in combination with the screening outcall engine 225 to initiate the screening outcall to the telephony device 130. The protocol stack 235 initiates the screening outcall to the switch 135. The switch 135 routes the screening outcall to the network 110. The network 110 routes the screening outcall to the telephony device 130. The screening outcall engine 225 in combination with the protocol stack 235 bridge the incoming call to the screening outcall in the listen-only mode providing for the screening of the incoming call from the telephony device 130. The screening outcall engine 225 monitors the screening outcall for the trigger from the telephony device 130. Upon receipt of the trigger, the screening outcall engine 225 in combination with the protocol stack 235 bridges the screening outcall to the call in the two-way mode providing for the interactive session between the telephony device 120 and the telephony device 130 and to halt the recording of the message.

In another example, the telephony device 120 initiates the incoming call to the telephony device 125. The switch 135 routes the incoming call to the messaging system component 105. The user interface logic component 220 employs the protocol stack 235 to retrieve the one profile associated with the telephony device 125 from the database 255. The user interface logic component 220 provides for the termination of the incoming call. The one profile associated with the telephony device 125 indicates that the screening in-call engine 230 responds to the screening in-call.

Upon receipt of the screening in-call, the screening in-call engine 230 associates the calling party number of the screening in-call with the mailbox of the telephony device 125 in which the message is being recorded. The screening in-call engine 230 in combination with the protocol stack 235 bridge the screening in-call with the incoming call in the listen-only mode and to monitor the screening in-call for the trigger.

Upon receipt of the trigger, the screening in-call engine 230 in combination with the protocol stack 235 bridge the incoming call with the screening in-call in the two-way mode providing for the interactive session between the telephony device 120 and the telephony device 130. The user interface logic component 220 stores the recorded message in the mailbox associated with the telephony device 125.

In a further example, the telephony device 120 comprise a cellular phone and the telephony device 125 comprises a personal computer. The telephony device 120 initiates the incoming call to the telephony device 125. The network 110 routes the incoming call to the telephony device 125. Where the telephony device 125 is dialed-up onto the internet, the telephony device 125 fails to respond to the incoming call. The network 110 re-routes the incoming call to the messaging system component 105.

The telephony component 205 communicates with the storage component 210 to retrieve the one profile associated with the telephony device 125. The one profile associated with the telephony device 125 indicates that the telephony device 125 comprises the screening device. The messaging system component 105 initiates a screening outcall of a Voice Over Internet Protocol ("VoIP") call to the telephony device 125. The screening outcall displays a pop-up window on the display of the telephony device 125 displaying a caller identification functionality. The telephony device 125 selects to screen the incoming call from the pop-up window. The messaging system component 105 bridges the incoming call to the screening outcall where the telephony device 125 selects to screen the call from the pop-up window on the display of the telephony device 125. The telephony device 125 screens the call as it is played from the telephony device 125. The messaging system component 105 bridges the incoming call to the screening outcall in the two-way mode where the telephony device 125 selects the interactive session from the pop-up window on the display of the telephony device 125.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   a messaging system component that provides for a screening, of an incoming call from a telephony device, wherein the messaging system component is associated with a network; and
   wherein the messaging system component conforms to a signaling protocol of the network to communicate with the network; and
   wherein upon receipt of the incoming call the messaging system component employs a profile associated with a called telephony device to provide for the screening of the incoming call from the telephony device; and
   wherein the profile comprises a) an email address, b) a plurality of numbers associated with the called telephony device, c) a Universal Resource Identifier (URI), and d) one or more filter rules; and
   wherein the messaging system component performs a validation on a calling party number of another telephony device to ensure that a message for the called telephony device is being recorded.

2. The apparatus of claim 1, wherein the messaging system component is located in a peripheral relationship to the network, and wherein the peripheral relationship to the network allows for the addition of providing for the incoming call to be screened from the another telephony device without modification to an architecture associated with the network.

3. The apparatus of claim 2, wherein the architecture associated with the network comprises a signaling infrastructure; and
   wherein the messaging system component that is located in a peripheral relationship to the network conforms to a signaling protocol associated with the signaling infrastructure; and
   wherein the messaging system component allows for the screening of the incoming call from the another telephony device without modification to the signaling infrastructure associated with the network.

4. The apparatus of claim 1, further comprising:
   telephony and signal processing hardware that conforms to the signaling protocol of the network, wherein a protocol stack employs the signaling protocol to communicate with the network without modification to a signaling infrastructure associated with the network.

5. The apparatus of claim 4, further comprising a screening engine, wherein the screening engine and the protocol stack bridge the incoming call to a screening call, allowing the incoming call to be screened by the another telephony device, and wherein the screening engine and the telephony and signal processing hardware serve to establish the screening call between the messaging system component and the another telephony device.

6. The apparatus of claim 5, wherein the screening engine and the protocol stack bridge the incoming call to the screening call in a listen-only mode that provides for a message to be screened from the telephony device in real-time.

7. The apparatus of claim 5, wherein upon receipt of a trigger the screening engine and protocol stack bridge the incoming call to the screening call in a two-way mode that provides for an interactive session between the telephony device and a calling telephony device, and wherein the calling telephony device initiates the incoming call.

8. The apparatus of claim 5, wherein the called telephony device receives the incoming call, and wherein the screening engine comprises a screening outcall engine, and wherein the screening call comprises a screening outcall, and wherein a screening device comprises the telephony device; and wherein the screening outcall engine and the telephony and signal processing hardware initiate the screening outcall to the screening device associated with the called telephony device; and wherein the screening engine and the protocol stack bridge the incoming call to the screening outcall provide for the screening, of the incoming call, from the telephony device, and wherein the telephony device responds to the screening outcall.

9. The apparatus of claim 8, wherein the screening outcall comprises a respective messaging number, and wherein the messaging number identifies the screening outcall as a screening call.

10. The apparatus of claim 5, wherein the screening engine comprises a screening in-call engine, and wherein the screening call comprises a screening in-call, and wherein the telephony device initiates the screening in-call to the messaging system component; and wherein upon receipt of the screening in-call from the telephony device the screening in-call engine and the protocol stack bridge the incoming call to the screening-in call to provide for the screening of the incoming call from the telephony device.

11. The apparatus of claim 10, wherein the screening in-call comprises a screening number, and wherein the messaging system component associates the screening in-call with a mailbox of a called telephony device based on the screening number of the screening in-call.

12. The apparatus of claim 5, wherein the screening call comprises a Voice Over Internet Protocol (VoIP) call.

13. The apparatus of claim 1, wherein the messaging system component provides for the screening, of the incoming call, by bridging the incoming call to a screening call, and wherein the telephony device is associated with the screening call.

14. The apparatus of claim 1, further comprising a database that stores the profile associated with the called telephony device.

15. The apparatus of claim 1, wherein the signaling protocol comprises Signaling System 7 (SS7) protocol.

16. A method, comprising the steps of:
providing for a screening, of an incoming call, from a telephony device by a messaging system component associated with a network; and
conforming to a signaling protocol of the network by the messaging system component to communicate with the network;
wherein upon receipt of the incoming call the messaging system component employs a profile associated with a called telephony device to provide for the screening of the incoming call from the telephony device; and
wherein the profile comprises a) an email address, b) a plurality of numbers associated with the called telephony device, c) a Universal Resource Identifier (URI), and d) one or more filter rules; and
wherein the messaging system component performs a validation on a calling party number of another telephony device to ensure that a message for the called telephony device is being recorded.

17. The method of claim 16, comprising the step of:
bridging the incoming call to a screening call in a listen-only mode providing for the screening of the incoming call from the telephony device.

18. The method of claim 17, wherein a calling telephony device initiates the incoming call, comprising the steps of:

monitoring the screening call from the telephony device;
receiving a trigger from the telephony device;
bridging the incoming call to the screening call in a two-way mode providing for an interactive session between the telephony device and the calling telephony device.

19. The method of claim 16, wherein the step of providing for the screening, of the incoming call, from the telephony device by the messaging system component associated with the network comprises the steps of:
retrieving the profile associated with the called telephony device of the incoming call from a database; and
employing the profile associated with the called telephony device, wherein the messaging system component provides for the screening, of the incoming call, by one of initiating a screening outcall and responding to a screening in-call.

20. The method of claim 16, wherein a screening device comprises the telephony device associated with the called telephony device, and wherein the screening call comprises a screening outcall, and wherein the step of providing for the screening, of the incoming call, from the telephony device by the messaging system component associated with the network comprises the steps of:
initiating the screening outcall to the screening devices associated with the called telephony device, wherein the called telephony device receives the incoming call; and
bridging the incoming call to the one screening outcall in a listen-only mode providing for the screening of the incoming call from the one screening device, wherein the one screening device responds to the screening outcall.

21. The method of claim 16, wherein the screening call comprises a screening in-call, and wherein the step of providing for the screening of the incoming call from the telephony device by the messaging system component associated with the network comprises the steps of:
responding to the screening in-call initiated by the telephony device; and
bridging the incoming call to the screening in-call of the telephony device in a listen-only mode providing for the screening of the incoming call from the telephony device in real-time.

22. The method of claim 21, comprising the step of:
employing a called party number of the screening in-call to associate the screening in-call to a mailbox of a called telephony device, wherein the called telephony device receives the incoming call.

23. The method of claim 16, comprising the step of:
conforming by the messaging system component to Signaling System 7 (SS7) protocol of the network to communicate with the network, wherein conforming to the signaling protocol to provide for the screening of the incoming call by the telephony device requires no modification to a signaling infrastructure associated with the network.

24. A tangible computer-readable medium having computer executable instructions for performing steps, comprising:
means in the one or more media for screening an incoming call from a telephony device by a messaging system component located in a peripheral relationship to a network;
means in the one or more media for conforming to a signaling protocol of the network by the messaging system component to communicate with the network;

means in the one or more media for retrieving a profile associated with a called telephony device of the incoming call from a database, wherein the profile comprises a) an email address, b) a plurality of numbers associated with the called telephony device, c) a Universal Resource Identifier (URI), and d) one or more filter rules; and means in the one or more media for employing the profile associated with the called telephony device, wherein the messaging system component provides for the screening, of the incoming call, by one of initiating a screening outcall and responding to a screening in-call;

wherein the messaging system component performs a validation on a calling party number of another telephony device to ensure that a message for the called telephony device is being recorded.

25. The apparatus of claim 1, wherein the called telephony device is a personal computer.

* * * * *